US009418460B2

(12) United States Patent
Nicholson et al.

(10) Patent No.: US 9,418,460 B2
(45) Date of Patent: Aug. 16, 2016

(54) ALIGNMENT BASED ON VISUAL CONTENT

(71) Applicant: Lenovo (Singapore) Pte. Ltd., Singapore (SG)

(72) Inventors: John Weldon Nicholson, Cary, NC (US); Mark Charles Davis, Durham, NC (US); Elif Karakaya, Raleigh, NC (US); Scott Edwards Kelso, Cary, NC (US); Steven Richard Perrin, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 288 days.

(21) Appl. No.: 14/038,129

(22) Filed: Sep. 26, 2013

(65) Prior Publication Data

US 2014/0282149 A1   Sep. 18, 2014

Related U.S. Application Data

(60) Provisional application No. 61/802,346, filed on Mar. 15, 2013.

(51) Int. Cl.
*G06T 11/60* (2006.01)
*G06F 3/0484* (2013.01)

(52) U.S. Cl.
CPC .............. *G06T 11/60* (2013.01); *G06F 3/0484* (2013.01); *G06T 2200/24* (2013.01)

(58) Field of Classification Search
CPC .................................................. G06T 2200/24
See application file for complete search history.

(56) References Cited

U.S. PATENT DOCUMENTS

2005/0237573 A1* 10/2005 Tomita .................... G06T 11/60
358/1.18

FOREIGN PATENT DOCUMENTS

JP      2007-040968 A  *  2/2007

* cited by examiner

*Primary Examiner* — Jeffery A Brier
(74) *Attorney, Agent, or Firm* — Kunzler Law Group

(57) ABSTRACT

Disclosed is a method including storing in a memory presentation data, including image data, processing the image data to generate positioning data for positioning the image on a presentation in accordance with a plurality of image positioning techniques, and selecting positioning data for positioning the image in accordance with at least one of the plurality of image positioning techniques. A user interface, which may be graphical, permits a user to toggle through the positions generated by the various techniques, and to lock the image in a desired position. Also disclosed are a system and a computer-usable storage medium having instructions thereon for implementing the method.

18 Claims, 4 Drawing Sheets

ALIGNMENT BASED ON VISUAL CONTENT

This application claims priority under 35. U.S.C. §119(e) from provisional patent application Ser. No. 61/802,346, filed on Mar. 15, 2013, which is incorporated herein by reference, in its entirety.

BACKGROUND OF THE DISCLOSURE

1. Field of the Disclosure

The present disclosure relates to apparatus and methods for aligning images in a presentation, such as a display screen or on a page. More particularly, it relates to aligning images so that they are located within a visual field at a place that makes the presentation appealing to a viewer.

2. Description of the Related Art

When aligning objects, for example two graphical elements in a presentation, sometimes the "center" of the object does not visually appear to be the center. For instance, there might be more white or background pixels on one side of the object than the other, or the object might be a graph which would best be centered on the graph axes, ignoring the labels which only appear on one side. An example of the former is a photograph of a baseball player holding a bat in an outstretched position. The center of the image does not necessarily seem properly aligned when it is placed at the center of the visual field.

There are some methods that attempt to center images, such as photographs, on a visual presentation. These include techniques such as edge detection and centroid calculation. However, it is very difficult for a general purpose method to provide for alignment of all types of image content. There are no existing solutions to this problem. At the present time, users must manually try to align objects if the actual center does not appear visually pleasing.

SUMMARY OF THE DISCLOSURE

There is a need for a system and a method to allow a user to easily align one or more images on a presentation such as on a display or a page, and to vary position of the images to achieve a visually desirable result, without having to do extensive experimentation.

In general, an embodiment of the disclosure is directed to a system for positioning an image on a visual presentation, comprising a memory for storing presentation data, including image data representative of the image; a processor for processing the image data to generate positioning data for positioning the image on the presentation in accordance with a plurality of image positioning techniques; and a graphical user interface displayed to a user for permitting the user to provide directions to the processor to select data for positioning the image in accordance with at least one of the plurality of positioning techniques.

The graphical user interface permits the user to provide input to position the image in successive positions on the presentation, wherein each position is in accordance with positioning data of one of the positioning techniques. The successive positions are in sequence so that the position of the image moves in only one direction as the successive positions are selected by the user.

Successive positions for the image are sorted by position so that selecting successive image positions sequentially selects data produced by the positioning techniques for the image to be moved in only one direction, as successive positions for the image are chosen. The graphical user interface provides a lock function for locking the displayed position of the image in one of a horizontal position and a vertical position, and permitting for successive inputs for moving the image in another of the successive horizontal positions and vertical positions. The graphical user interface also provides a lock function for locking the displayed position of the image in another of the horizontal position and the vertical position.

The system further comprising a graphical user interface that permits a user to select a row or column of images to be aligned using one of the plurality of image positioning techniques. The imaging positioning techniques can be selected from the group consisting of centroiding and edge detection. If the imaging positioning technique is centroiding. It can be selected from the group consisting of grayscale centroiding, threshold centroiding and determining the centroid for each value of threshold, and clustering the results.

An embodiment of the disclosure is directed to a method for positioning an image on a visual presentation, comprising storing in a memory presentation data, including image data representative of the image; processing the image data to generate positioning data for positioning the image on the presentation in accordance with a plurality of image positioning techniques; and selecting data for positioning the image in accordance with at least one of the plurality of positioning techniques.

The method can further comprise providing input to position the image in successive positions on the presentation, wherein each position is in accordance with positioning data of one of the positioning techniques. The successive positions can be in sequence so that the position of the image moves in only one direction as the successive positions are selected.

The method can further comprise sorting successive positions for the image by position so that selecting successive image positions sequentially selects data produced by the positioning techniques, for the image to be moved in only one direction, as successive positions for the image are chosen. The method can further comprise locking the displayed position of the image in one of a horizontal position and a vertical position, and moving the image in another of the successive horizontal positions and vertical positions. The method can also further comprising locking the displayed position of the image in another of the horizontal position and the vertical position.

The method can further comprise selecting a row or column of images to be aligned using one of the plurality of image positioning techniques.

The imaging positioning techniques can be selected from the group consisting of centroiding and edge detection. When the imaging positioning technique is centroiding, it can be selected from the group consisting of grayscale centroiding, threshold centroiding, and determining a centroid for each value of threshold and clustering the results.

The disclosure is also directed to a computer readable non-transitory storage medium storing instructions of a computer program which when executed by a computer system results in performance of steps of a method for positioning and image on a presentation, comprising storing in a memory presentation data, including image data representative of the image; processing the image data to generate positioning data for positioning the image on the presentation in accordance with a plurality of image positioning techniques; and selecting data for positioning the image in accordance with at least one of the plurality of positioning techniques.

The storage medium can further comprise instructions of a computer program which when executed by a computer system results in performance of steps of providing input to position the image in successive positions on the presentation, wherein each position is in accordance with positioning data of one of the positioning techniques.

The storage medium can further comprise instructions of a computer program which when executed by a computer system results in performance of steps of moving the image to successive positions in sequence so that the position of the image moves in only one direction as the successive positions are selected.

BRIEF DESCRIPTION OF THE DRAWINGS

A component or a feature that is common to more than one drawing is indicated with the same reference number in each of the drawings.

DESCRIPTION OF THE EMBODIMENTS

Figure 1:
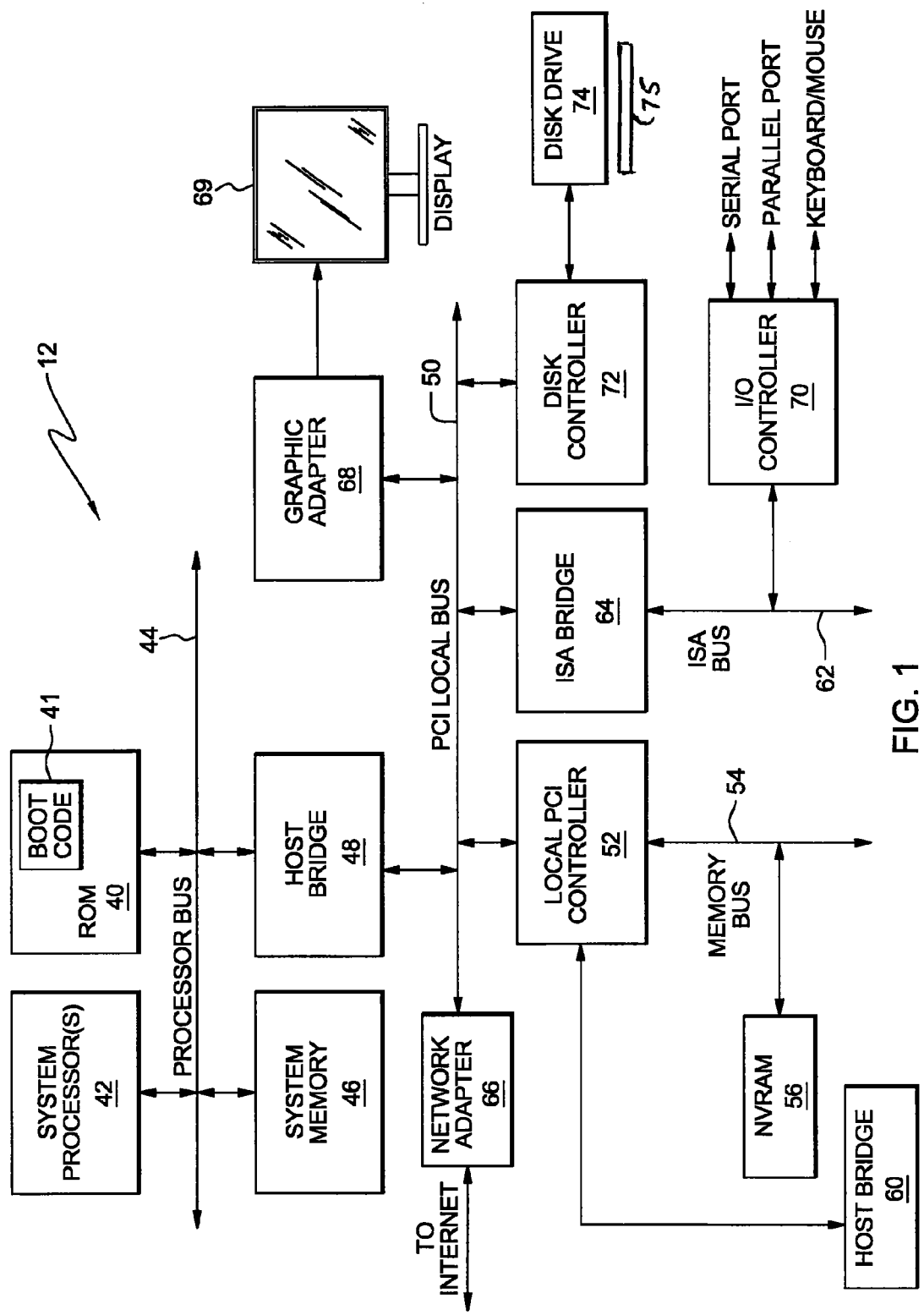
FIG. 1 is a block diagram of a computer system according to a preferred embodiment which incorporates the functions of the present disclosure.

Referring now to FIG. 1, there is depicted a block diagram of an illustrative embodiment of a computer system 12. The illustrative embodiment depicted in FIG. 1 may be a desktop computer system, such as one of the ThinkCentre or computers, or a laptop computer such as one of the ThinkPad series of personal computers sold by Lenovo (US) Inc. of Morrisville, N.C., or a workstation computer, such as the Intellistation, which are sold by International Business Machines (IBM) Corporation of Armonk, N.Y.; however, as will become apparent from the following description, the present disclosure is applicable to any data processing system.

As shown in FIG. 1, computer system 12 includes at least one system processor 42, which is coupled to a Read-Only Memory (ROM) 40 and a system memory 46 by a processor bus 44. System processor 42, which may comprise one of the PowerPC line of processors produced by IBM Corporation, is a general purpose processor that executes boot code 41 stored within ROM 40 at power on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

Application software stored in system memory 46 may include a multitude of application programs found on any computer. Among these programs, may be word processor or graphical design programs wherein an image can be imbedded in a page or other presentation. As noted above, a significant problem associated with the use of an image, is determining how to place the image on the page or presentation. The present disclosure can be embodied in an additional application program that interacts with the word processor or graphical design program to position the image on a page or a portion of another type of presentation. This additional program can be stored on an external storage medium 75, that is read by disk drive 74, and copied from storage medium 75 into system memory 46, and stored on system memory 46 to facilitate use of the program by computer system 12. The disk drive 74 communicates with a disk controller 72, and the disk controller 72 communicates with the PCI local bus 50. Thus, the storage media can be a computer hard drive, a flash memory, RAM, ROM, CD, DVD, magnetic tape or any medium capable of storing the program.

Figure 2:
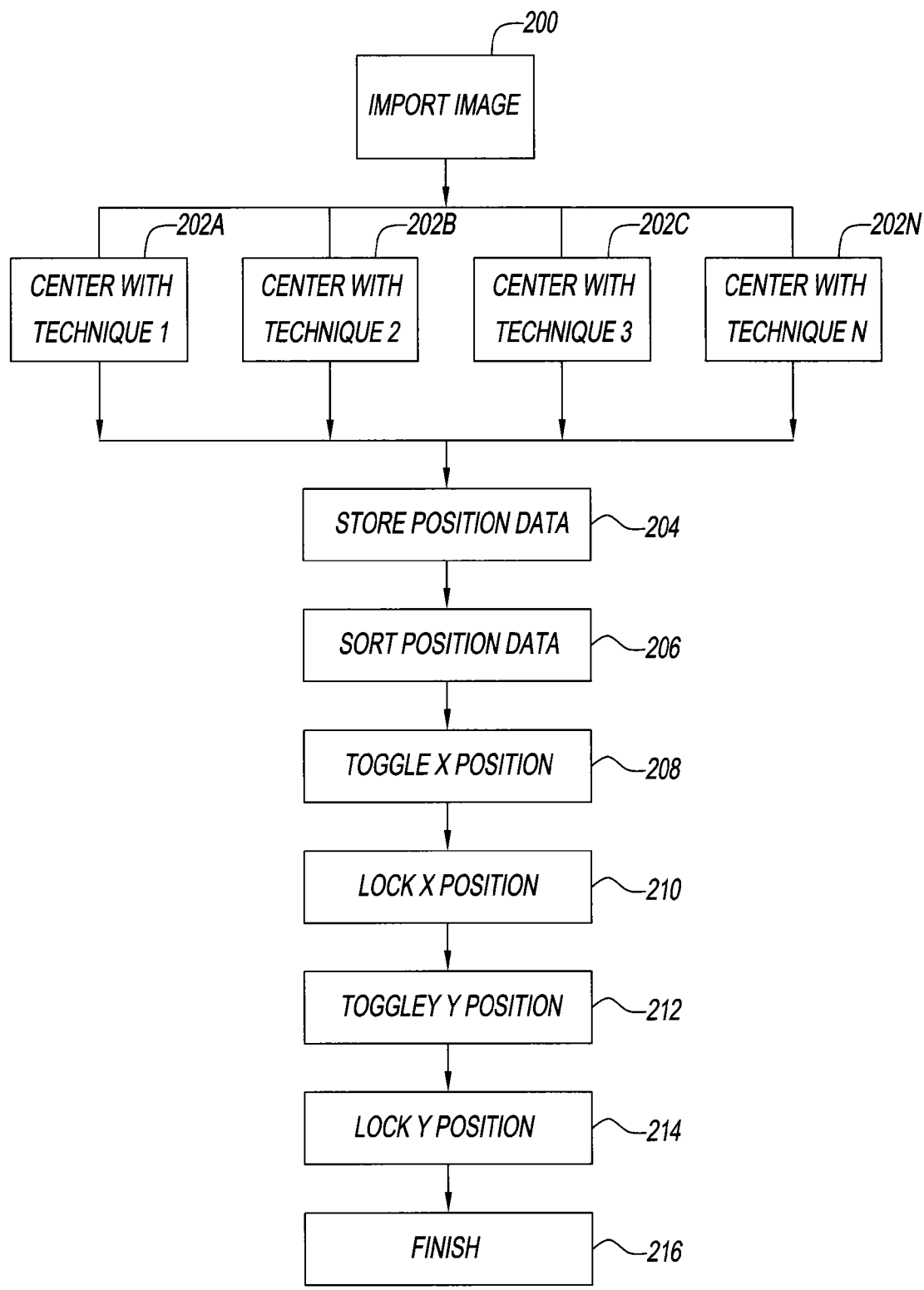
FIG. 2 is a flow chart of the operation of the system and method disclosed herein.

FIG. 2 is a flow chart of the operation of the system and method disclosed herein. An image that is to be placed in a presentation is imported at 200 in one of several ways. For example, in word processing programs, an image may be dropped at an initial position by using an inset function to place an image at a particular place in the presentation. In some drawing programs, an image may simply be drawn at an initial estimated position.

At 202A, 202B, 202C to 202N, any one of several centering techniques is executed. For example, at 202A, using a first technique, the "centroid" coordinates of the image after converting to grayscale, where "brighter" pixels are given more weight:

$$\bar{x} = \frac{\Sigma_r \Sigma_c c p_{r,c}}{\Sigma_r \Sigma_c p_{r,c}}$$

$$\bar{y} = \frac{\Sigma_r \Sigma_c r p_{r,c}}{\Sigma_r \Sigma_c p_{r,c}}$$

where $p_{r,c}$ is the brightness of the pixel of the given row (r) and column (c). Conversion of a color image to grayscale can be achieved in many ways well known in the art. As an example, and not by way of limitation, the relationship: grayscale brightness=0.299*red brightness+0.587*green brightness+ 0.114*blue brightness can be used.

In 202B, using a second technique, the "centroid" of the image after having been thresholded or made binary using Otsu's method, which thresholds the image at each value of threshold, then uses the value with the least intra-class variance. More specifically, Otsu's method is used to automatically perform histogram shape-based image thresholding, or, the reduction of a graylevel image to a binary image. The algorithm assumes that the image to be thresholded contains two classes of pixels or bi-modal histogram (e.g. foreground and background) then calculates the optimum threshold separating those two classes so that their combined spread (intra-class variance) is minimal.

This first technique may be implemented using the following steps:

Compute histogram and probabilities of each intensity level.

Set up initial $\omega_i(0)$ and $\mu_i(0)$.

Step through all possible thresholds t=1 . . . maximum intensity.

Update $\omega_i$ and $\mu_i$.

Compute $\sigma_b^2(t)$.

Desired threshold corresponds to the maximum $\sigma_b^2(t)$

Compute two maxima (and two corresponding thresholds). $\sigma_{b1}^2(t)$ is the greater max and $\sigma_{b2}^2(t)$ is the greater or equal maximum Compute the desired threshold=(threshold$_1$+threshold$_2$)/2.

At 202C, using a third technique, the centroid for each value of threshold is determined, the results are clustered, and the two or three most prominent clusters are used to define the center.

At 202N, using an Nth technique, edge detection and morphological closing are used to determine centering information for an image. The benefit of this approach is that content which is the same color as the "background" has an effect on the centroid determination.

While different centering techniques are described above with respect to 202A, 202B, 202C and 202N, there are other image centering techniques that can be used.

At 204, image centering data, in the form of coordinates developed at 202A, 202B, 202C and 202N, are stored for later use.

At 206, the coordinate values are sorted in order of their positions along the X axis. For example, the value that places the image most the left in the presentation is stored in a first position in memory. The value that moves the image the smallest amount to the right is stored in a second memory position. The value that moves the position more to the right is stored in a third position. If there are only four centering methods being used, the value that moves the image to the farthest to the right is stored in a fourth memory position.

Also, at 206, the values that place the image in successive vertical or Y coordinate positions are stored in successive memory locations.

At 208, as also explained below by referring to FIG. 3, the X values of position can be successively selected by "toggling through" the X positions. At 210, when a horizontal position of the image looks best in the presentation or on a page, the X coordinate can be "locked" so that toggling through successive X positions is no longer possible.

At 212, successive computed values for centering the image in the Y direction can be toggled through in the same manner as for the calculated X position values. At 214, the Y position of the image is locked, in the same manner as the X position is locked in at 214. At 216 the process is complete.

User inputs to the system may be provided in a variety of ways. While a graphical user interface is described below, keyboard shortcuts, including those such as "hot" keys, touch inputs to a touch screen, gestures or other movements that are sensed by computer system 12, and voice commands are just some examples of inputs that can cause toggling through the various centering techniques or modes described above. All of these are examples of possible user interfaces.

Figure 3:
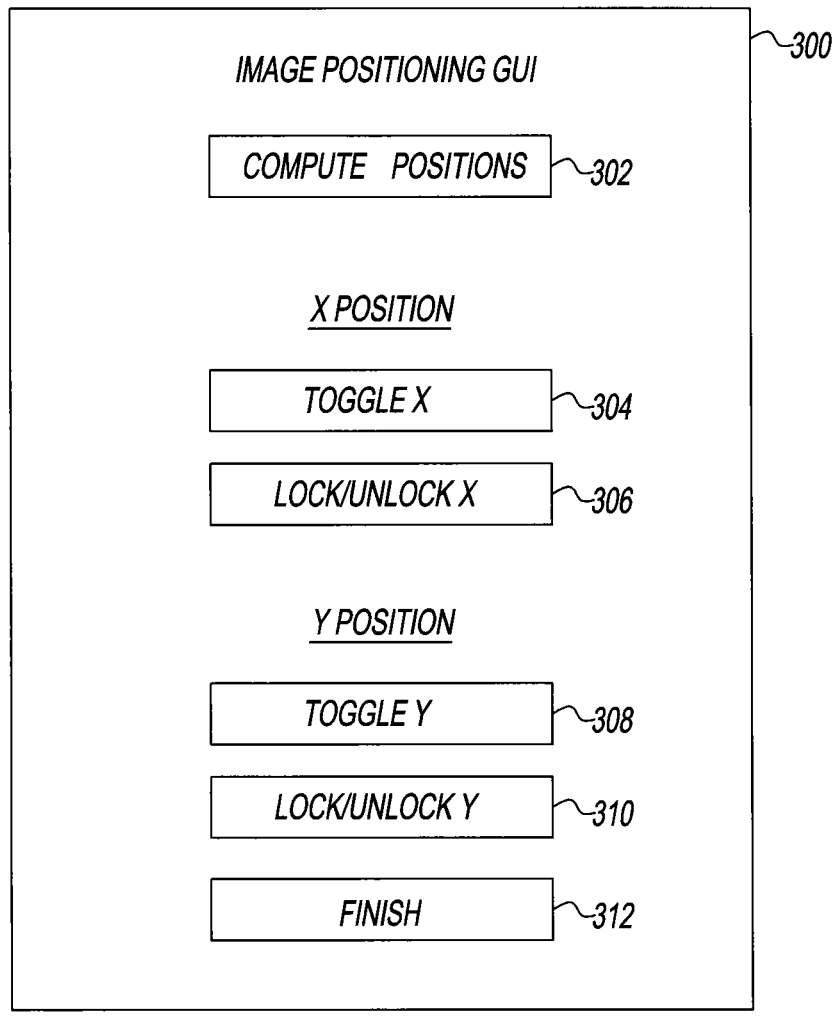
FIG. 3 is a graphical user interface or GUI which is used to control the system and method disclosed herein.

Referring to FIG. 3, in one embodiment, a graphical user interface GUI 300 will appear in a portion of a screen on display 69, in the foreground over the presentation or screen having an image therein, when the image to be positioned is highlighted. A first selection region, called compute position 302 will cause the X and Y coordinates to be calculated by all of the methods represented by 202A, 202B, 202C to 202N, as described above, when selected by placing a cursor on the compute position 302 selection region, and left clicking to select the function. As noted above, the coordinates selected by each method are sequenced, and can be successively selected for positioning the highlighted image. This can be done in the X direction by successively placing a cursor on the sequence X region 304, and toggling through the various X positions from left to right. When the right most position is reached, further toggling will cause the sequence of positions to be repeated by wrapping around to left-most and top-most positions. Alternatively, further toggling can cause the sequence of positions to be stepped through in reverse order; that is there can be a forward and a backward cycling through the positions. With a keyboard "hot key" interface, a selection of right or left, or up or down, can be made, for example, by using "Alt-Tab" and "Alt-Shift-Tab" or "outdent" and "indent".

When a position is deemed best by an observer, the lock/unlock X region 306 is selected by the cursor to lock the desired X position. The lock/unlock X region 306 changes color to indicate that the selected X position has been locked. If it is desirable to unlock the X position, placing the cursor on lock/unlock X region 306 and clicking again will unlock the X position so that it can again be changed by toggling the sequence X region 304.

The observer can then place the cursor on second selection region, by successively placing the cursor on the sequence Y region 308, and toggling through the various Y positions from top to bottom. When the lower most position is reached, further toggling will cause the sequence of Y positions of the image to be repeated. Alternatively, further toggling can cause the sequence of Y positions to be stepped through in reverse order.

When a position is deemed best by an observer, the lock/unlock Y region 310 is selected by the cursor to lock the desired Y position. The lock/unlock Y region 310 changes color to indicate that the selected Y position has been locked. If it is desirable to unlock the Y position, placing the cursor on lock/unlock Y region 310 and clicking again will unlock the Y position so that it can again be changed by toggling the sequence Y region 308.

When the desired position is deemed finalized for best presentation, the cursor is moved over the finish region 312, and a mouse button is clicked. Display of the GUI 300 is terminated, unless the selected image is again highlighted.

Figure 4A:
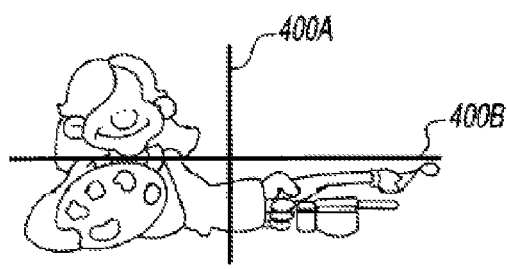
FIGS. 4A, 4B and 4C illustrate three images that are aligned by centers.
Figure 4D:
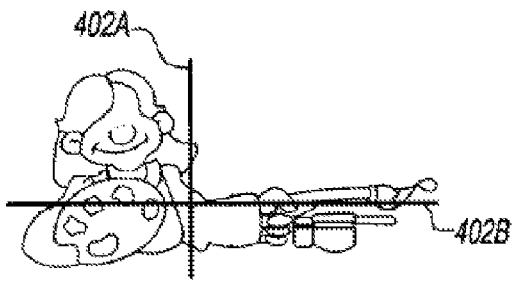
FIGS. 4D, 4E and 4F illustrate three images that are aligned by grayscale centroids.
Figure 4B:
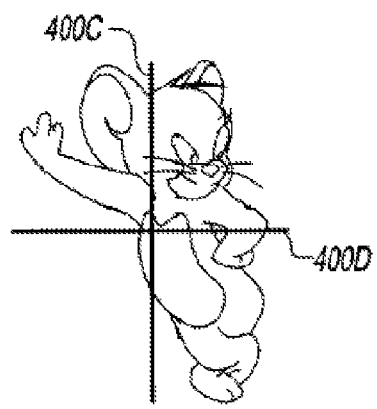
Figure 4E:
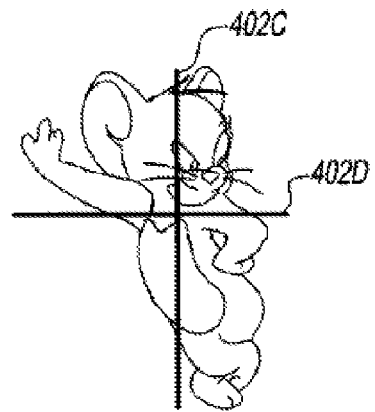
Figure 4C:
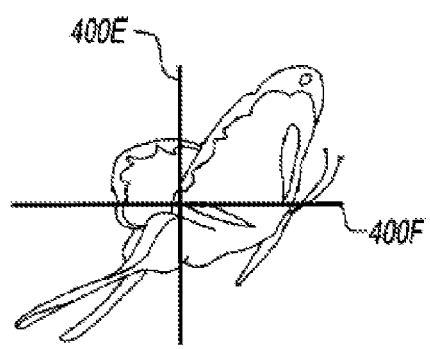

Referring to FIG. 4A, FIG. 4B and FIG. 4C, the images shown therein are aligned by geometric centers in the X direction (the direction from right to left). The geometric centers are represented by lines 400A and 400B in FIG. 4A, lines 400C and 400D in FIG. 4B, and lines 400E and 400F in FIG. 4C.

Figure 4F:
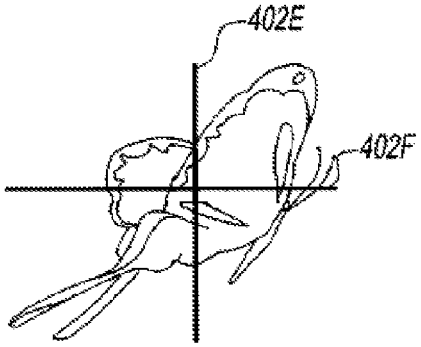

Referring to FIG. 4D, FIG. 4E and FIG. 4F, the images shown therein are aligned by centroids in the X direction (the direction from right to left). The centroids are represented by lines 402A and 402B in FIG. 4D, lines 402C and 402D in FIG. 4E and lines 402E and 402F in FIG. 4F.

It is apparent that different visual impressions are created by the X position alignment of the images in FIGS. 4A, 4B and 4C, verses X position alignment of the images in FIGS. 4D, 4E and 4F. To a casual observer, it is likely that FIGS. 4D, 4E and 4F, using computed centroid techniques, seem to be more closely aligned to one another in the X direction, and that there is a less aligned impression created of X position alignment of the images in FIGS. 4D, 4E and 4F due to the geometric centers being aligned. However, regardless of the preference of the observer, the various arrangements of the images on the page can readily be selected by the process described in FIG. 2, and with the use of the GUI 300 of FIG. 3.

Additional convenience may be included by providing an automatic alignment function. A second GUI may be brought up by highlighting more than one image on a page or presentation, by moving the curser over several images in either the X direction (from right to left or from left to right) or in the Y direction (from top down or from bottom up), thus selecting a row or column of images. In this case a GUI with active regions labeled in accordance with the centering technique (FIG. 2) that is to be used, is displayed. When one of the centering techniques is selected, by placing the cursor over the active region representing a selected technique, all highlighted images are aligned in a direction perpendicular to the direction of highlighting by the selected technique, thus producing, for example, alignment of the images as shown in FIGS. 4A, 4B and 4C, or alignment of the images as shown in FIGS. 4D, 4E and 4F.

If the observer is not satisfied with the image produced by using the same centering technique for a row or column of selected images, and wishes to adjust the positioning of a selected image after a centering technique has been used to align a row or column of images, an individual image may be selected to bring up the GUI of FIG. 3, as described above. The position of the image in either the X or Y direction may be changed by toggling through the stored positions, as described above with respect to FIG. 3.

It will be understood that the disclosure may be embodied in a computer readable non-transitory storage medium storing instructions of a computer program that when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A system comprising:
   a memory that stores presentation data including image data;
   a processor that processes the image data to generate positioning data for positioning the image on a presentation in accordance with a plurality of image positioning techniques, wherein the plurality of image positioning techniques comprises at least one of:
      positioning the image using centroid coordinates of the image determined after converting the image to grayscale;
      positioning the image using centroid coordinates of the image determined after converting the image to a binary image;
      positioning the image using centroid coordinates of the image, wherein the centroid coordinates are determined using clusters of image data; or
      positioning the image based on edge detection; and
   a user interface that:
      permits the user to provide directions to the processor to select positioning data for positioning the image in accordance with at least one of the plurality of image positioning techniques; and
      displays the image in a displayed position based on the selected positioning data.

2. The system of claim 1, wherein the user interface permits the user to provide input to position the image in successive positions on the presentation, wherein each position is in accordance with positioning data of one of the positioning techniques.

3. The system of claim 2, wherein the successive positions are in sequence so that the position of the image moves in only one direction as the successive positions are selected by the user.

4. The system of claim 2, wherein successive positions for the image are sorted by position so that selecting successive image positions sequentially selects data produced by the positioning techniques for the image to be moved in only one direction, as successive positions for the image are chosen.

5. The system of claim 2, wherein the user interface provides a lock function for locking the displayed position of the image in one of a horizontal position and a vertical position, and permits successive inputs for moving the image in another of the successive horizontal positions and vertical positions.

6. The system of claim 5, wherein the user interface provides a lock function for locking the displayed position of the image in another of the horizontal position and the vertical position.

7. The system of claim 1, wherein the user interface permits a user to select a row or column of images to be aligned using one of the plurality of image positioning techniques.

8. The system of claim 1, wherein the user interface is a graphical user interface.

9. A method comprising:
   storing in a memory presentation data including image data;
   processing the image data to generate positioning data for positioning the image on a presentation in accordance with a plurality of image positioning techniques, wherein the plurality of image positioning techniques comprises at least one of:
      positioning the image using centroid coordinates of the image determined after converting the image to grayscale;
      positioning the image using centroid coordinates of the image determined after converting the image to a binary image;
      positioning the image using centroid coordinates of the image, wherein the centroid coordinates are determined using clusters of image data; or positioning the image based on edge detection;
   selecting positioning data for positioning the image in accordance with at least one of the plurality of image positioning techniques; and
   displaying the image in a displayed position based on the selected positioning data.

10. The method of claim 9, further comprising providing input to position the image in successive positions on the presentation, wherein each position is in accordance with positioning data of one of the positioning techniques.

11. The method of claim 10, wherein the successive positions are in sequence so that the position of the image moves in only one direction as the successive positions are selected.

12. The method of claim 10, further comprising sorting successive positions for the image by position so that selecting successive image positions sequentially selects data produced by the positioning techniques, for the image to be moved in only one direction, as successive positions for the image are chosen.

13. The method of claim 12, further comprises locking the displayed position of the image in one of a horizontal position and a vertical position, and moving the image in another of the successive horizontal positions and vertical positions.

14. The method of claim 13, further comprising locking the displayed position of the image in another of the horizontal position and the vertical position.

15. The method of claim 9, further comprising selecting a row or column of images to be aligned using one of the plurality of image positioning techniques.

16. A non-transitory computer-usable storage medium embodying computer program code, said computer program code comprising computer-executable instructions configured for:

storing in a memory presentation data including image data representative of the image;

processing the image data to generate positioning data for positioning the image on a presentation in accordance with a plurality of image positioning techniques, wherein the plurality of image positioning techniques comprises at least one of:

positioning the image using centroid coordinates of the image determined after converting the image to grayscale;

positioning the image using centroid coordinates of the image determined after converting the image to a binary image;

positioning the image using centroid coordinates of the image, wherein the centroid coordinates are determined using clusters of image data; or positioning the image based on edge detection;

selecting positioning data for positioning the image in accordance with at least one of the plurality of image positioning techniques; and displaying the image in a displayed position based on the selected positioning data.

17. The storage medium of claim 16, further comprising instructions of a computer program which when executed by a computer system results in providing input to position the image in successive positions on the presentation, wherein each position is in accordance with positioning data of one of the positioning techniques.

18. The storage medium of claim 16, further comprising instructions of a computer program which when executed by a computer system results in moving the image to successive positions in sequence so that the position of the image moves in only one direction as the successive positions are selected.

* * * * *